Figure 1:
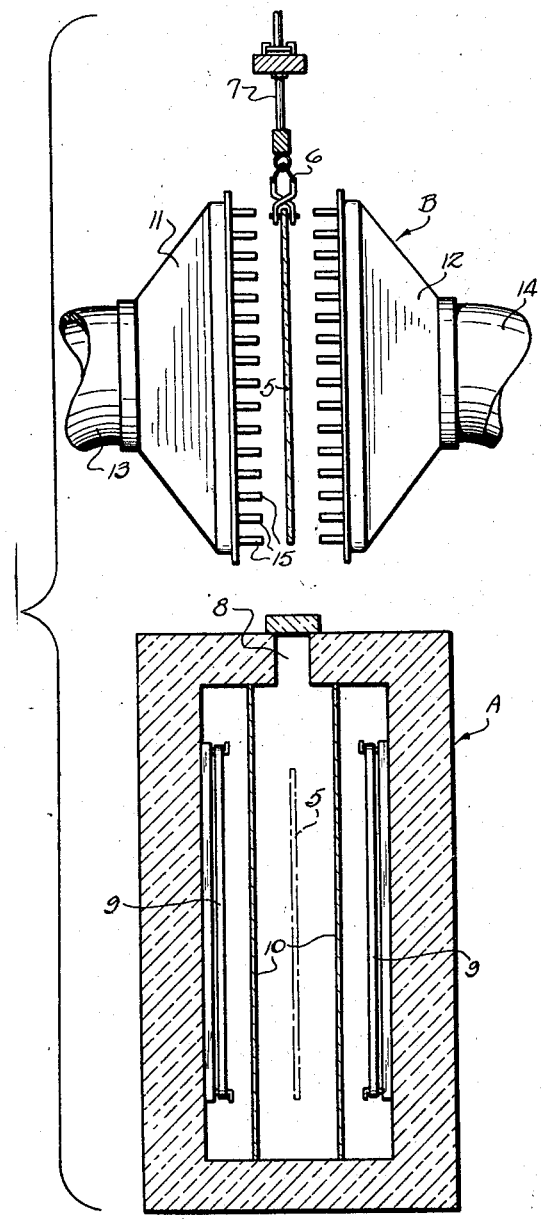

Nov. 13, 1945.  G. WHITE  2,388,808
METHOD OF TEMPERING GLASS
Filed April 7, 1941

Inventor
GERALD WHITE.
By Frank Fraser
Attorney

Patented Nov. 13, 1945

2,388,808

UNITED STATES PATENT OFFICE 2,388,808

METHOD OF TEMPERING GLASS

Gerald White, Toledo, Ohio, assignor to Libbey-Owens-Ford Glass Company, Toledo, Ohio, a corporation of Ohio Application April 7, 1941, Serial No. 387,225

2 Claims. (Cl. 49—89)

The present invention relates to an improved method of tempering glass.

In the usual method of tempering glass, the glass is first heated in a suitable furnace to a temperature approximating the softening point of the glass, after which it is withdrawn from the furnace and rapidly cooled by jets or blasts of air directed upon the glass surfaces under pressure.

The treatment of the glass in this manner produces a marked temperature differential between the interior and the surface portions of the glass, with the result that the hot interior glass is prevented from contracting when it cools by the stiffening of the cooler surface portions whereby the outer surfaces of the glass are placed under compression and the interior thereof under tension. This strained condition of tempered glass materially increases its mechanical strength and further modifies its breaking characteristics in that if and when broken it will disintegrate into innumerable small and relatively harmless particles instead of breaking into large dangerous pieces or slivers as is the case with ordinary glass.

The cooling means usually employed comprises a pair of spaced blower heads between which the highly heated glass is received; each blower head being provided with a plurality of outlets through which jets or blasts of air are projected against the glass surfaces. To effect a more even distribution of the air over the glass and in consequence a more uniform cooling thereof, it is desirable that relative movement between the blower heads and glass be effected during the cooling operation. The effect of the cooling operation is to produce strain in the glass at selected points whereby a predetermined desired breaking pattern may be obtained.

The character or type of break obtained depends, among other factors, upon the time and temperature cycle followed in the tempering operations, and in order to set up the desired strain in the glass whereby to produce this predetermined breaking pattern, it is essential that the glass be heated for a predetermined length of time to a predetermined temperature and then cooled for a predetermined length of time at a predetermined temperature. Any variation in the time and temperature cycle after it has once been established to obtain a desired type of break will affect or modify the breaking pattern of the glass or, in other words, the character of its burst.

Heretofore, it has been customary for the supply of cooling air for the blower heads to be taken directly from the atmosphere and without being treated in any way, passed directly to the blower heads and projected thereby upon the glass. Due to variations in atmospheric temperature, however, the temperature of the outside air supplied to the blower heads will vary greatly from day to day and likewise the humidity or moisture content of the air will vary. This continual varying of the temperature and humidity of the cooling air renders difficult the establishment and maintenance of predetermined temperature conditions over any considerable length of time, as a result of which the breaking pattern of successive glass articles produced will tend to vary making difficult the manufacture of a constant, uniform product.

It is an aim of this invention to provide a novel method of tempering glass wherein a more positive and accurate control of the air supply for cooling is obtained by feeding conditioned air to the blower heads to the end that a more constant, uniform tempering of the glass can be achieved to produce a more uniform product having a predetermined breaking pattern.

Generally stated, this is achieved by conditioning the air supply so that it has a constant, predetermined temperature and moisture content. By maintaining the temperature and humidity of the cooling air constant, it is possible to establish and maintain predetermined conditions as to cooling even though the atmospheric temperature may undergo considerable variation both as regards temperature and humidity. The supplying of air of a constant, predetermined temperature and humidity to the blower heads greatly facilitates and improves the tempering of the glass and makes it easier to establish and maintain predetermined cooling conditions.

Other objects and advantages of the invention will become more apparent during the course of the following description, when taken in connection with the accompanying drawing.

Figure 2:
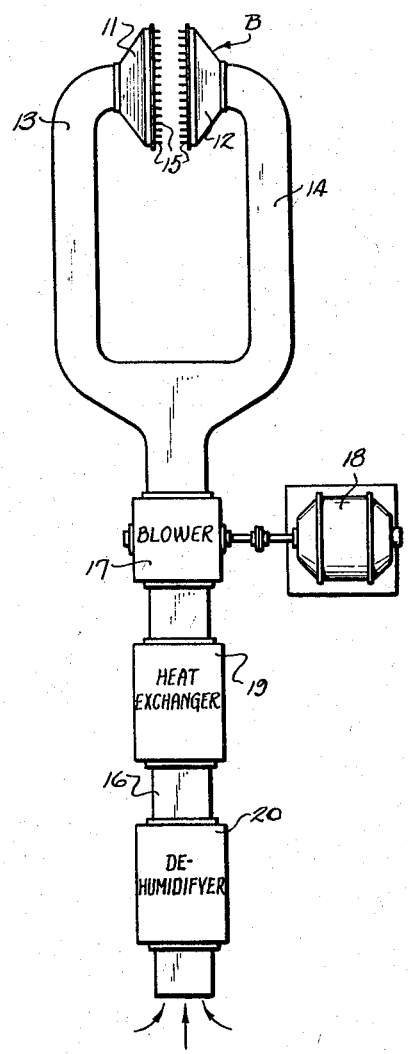

In the drawing, wherein like numerals are employed to designate like parts throughout the same:

Fig. 1 is a view of one form of apparatus used for tempering glass according to the present invention, the means for heating the glass being shown in section and the cooling means in elevation; and Fig. 2 is a diagrammatic plan view of the cooling means.

Although the apparatus illustrated in the drawing is adapted for the tempering of glass sheets or plates, it will be understood that the invention is in no way limited to the tempering of flat sheets or plates, but may be used in the treatment of various types of glass articles.

In the embodiment of the invention shown in the drawing, the means for heating the glass sheets comprises a furnace designated in its entirety by the letter A, while the means for subsequently chilling or cooling the sheets is designated generally by the letter B. The cooling means B is arranged directly above the furnace A so that the glass sheet 5, after being heated within the furnace, can be transferred directly to the cooling means without any undue loss of heat and without being adversely affected by atmospheric conditions during the transfer. The glass sheet 5 is suspended in a vertical position during the heating and cooling operations by relatively small tongs 6 engaging the sheet near its upper edge and being carried by a suitable supporting means 7.

The furnace A may be of an electrically heated type and is provided with a top opening 8 through which the glass sheet 5 to be treated may be inserted and removed. Any suitable removable covering can be used for the opening 8 as will be apparent. For the purpose of heating the furnace, electrical heating elements 9 may be used in conjunction with baffle plates 10 which define therebetween a chamber for receiving the glass sheet 5. By means of any conventional indicating and control mechanism the temperature of the furnace can be regulated to heat the glass sheet to approximately its point of softening, which is in the neighborhood of 1250 degrees Fahrenheit for ordinary flat glass.

When the glass sheet has been heated to the desired temperature within the furnace, it is lifted therefrom through the top opening 8 and subjected immediately to the action of the cooling means B; said means comprising spaced blower heads 11 and 12 connected by conduits 13 and 14 respectively to suitable blowing apparatus, which will be hereinafter described, so that jets or blasts of air can be directed simultaneously upon opposite surfaces of the glass sheet when brought into position between said blower heads. Each blower head may be provided with a plurality of nipples 15 through which the jets or blasts of air are directed against the sheet.

As shown in Fig. 2, the conduits 13 and 14 associated with the blower heads 11 and 12 are connected at their opposite ends to a common air supply pipe 16 having interposed therein a blower 17 operable from a motor 18. Upon operation of the blower, air will be drawn into the outer open end of pipe 16 and forced through the conduits 13 and 14 to blower heads 11 and 12 where it will be discharged through the nipples 15 against the glass sheet 5.

As pointed out above, it has been heretofore customary to take the air for cooling directly from the atmosphere and deliver it to the blower heads without in any way treating or conditioning the same. Also, that with such method it is difficult to maintain established predetermined cooling conditions over any considerable period of time because of variations in the temperature and humidity of the air. In accordance with this invention, the above objections are avoided and a more positive control of the cooling of the glass obtained by conditioning the air before it is supplied to the blower heads. The result is that the cooling air has a constant, predetermined temperature and moisture content.

To this end, there is also interposed in the air supply pipe 16 a heat exchanger 19 of any suitable construction and also a dehumidifier 20 of any preferred type. For example, the dehumidifier may be of the general type disclosed in the Sweet's Catalog File (process industries) for 1942, at 5c/2; while a heat exchanger such as is shown at 1e/5 in the same catalog file can be used. With this arrangement, the air drawn through the pipe 16 by the blower 17 is caused to pass first through the dehumidifier and then through the heat exchanger before reaching said blower. During its passage through the dehumidifier 20 the air is treated so that it will have a predetermined moisture content and upon passing through the heat exchanger 19 the air is further treated so that it is of a predetermined temperature. Thus, regardless of variations in the temperature and humidity of the atmosphere, the temperature and moisture content of the cooling air delivered to the blower heads will remain constant so that a more uniform product is obtainable, i. e. glass sheets or other glass articles having strain therein at selected points and a desired predetermined breaking pattern.

Although improved results can be obtained over the usual method of maintaining the cooling air at a constant, predetermined temperature, even though the moisture content thereof may vary somewhat, it is preferred for best results that both the temperature and humidity of the cooling air be prevented from fluctuating.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a method of tempering glass sheets or other glass articles wherein said sheets or articles are first heated to a temperature approximating the softening point of the glass and then suddenly cooled by being subjected to the direct action of air under pressure, the steps of conditioning air by removing moisture therefrom to bring said air to a predetermined humidity and bringing the air to a predetermined temperature, and then directing the conditioned air upon successive heated glass sheets or other glass articles.

2. In the method of tempering glass sheets or other glass articles wherein said sheets or articles are first heated to a temperature approximating the softening point of the glass and then suddenly cooled by being subjected to the direct action of air under pressure, the steps comprising conditioning air received directly from the atmosphere by dehumidifying said air to a predetermined humidity, then bringing the dehumidified air to a predetermined temperature, and then blowing the conditioned air upon successive glass sheets or other glass articles.

GERALD WHITE.